(12) United States Patent
Heinrich

(10) Patent No.: US 7,759,825 B2
(45) Date of Patent: Jul. 20, 2010

(54) RECHARGEABLE BATTERY WITH A FUSE

(75) Inventor: Thomas Heinrich, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 12/144,943

(22) Filed: Jun. 24, 2008

(65) Prior Publication Data
US 2009/0009008 A1    Jan. 8, 2009

(30) Foreign Application Priority Data
Jul. 6, 2007   (DE) .................. 10 2007 031 565

(51) Int. Cl.
*H01H 3/00* (2006.01)
(52) U.S. Cl. ..................................... 307/139
(58) Field of Classification Search ............ 307/139
See application file for complete search history.

(56) References Cited

U.S. PATENT DOCUMENTS 4,710,847 A * 12/1987 Kortschinski et al. ....... 361/125

* cited by examiner

*Primary Examiner*—Robert L. DeBeradinis
(74) *Attorney, Agent, or Firm*—Ronald E. Greigg

(57) ABSTRACT

In a rechargeable battery with a fuse for guarding against external short circuits, to make it possible to design the rechargeable battery independently of the possibly high normal continuous current, it is proposed that a signal connection existing between the rechargeable battery and a device provided for drawing current be utilized. To that end, a switch is provided, which is connected parallel to the fuse and which responds to certain electrical signals of the device. The signals can be delivered to the switch via the signal connection, so that the switch bypasses the fuse, once the signal connection is established and the aforementioned signals occur.

18 Claims, 1 Drawing Sheet ated for drawing in designing the
RECHARGEABLE BATTERY WITH A FUSE

CROSS-REFERENCE TO RELATED APPLICATIONS

This application is based on German Patent Application No. 10 2007 031 565.3 filed on Jul. 6, 2007, upon which priority is claimed.

BACKGROUND OF THE INVENTION

1. Field of the Invention

The invention relates to a rechargeable battery having a fuse for guarding against external short circuits, in which, between the rechargeable battery and a device normally provided for drawing current from the rechargeable battery, an electrical or electromagnetic signal connection not intended for drawing current can be established.

2. Description of the Prior Art

At present, when a rechargeable battery discharges normally, the current is typically regulated by a suppressor circuit, so that in normal operation no fault can occur. A fuse of the kind long known in the prior art is actually unnecessary, in terms of normal operation of a rechargeable battery and of the type of device or machine normally provided for drawing current from this rechargeable battery. However, if the rechargeable battery is handled or stored improperly, for instance connected to a device without a suppressor circuit, then an external short circuit can occur. For this abnormal operating situation, a conventional fuse that must necessarily trip in the event of a fault is provided.

In modern fuses used in rechargeable batteries to guard against short circuits, there must be a ratio of approximately 1:2 to 2.5 between the continuous current allowed for drawing current in normal operation and the short-circuit current that flows in the event of a fault, in order to make a reliable fuse design possible. However, then the problem arises that the allowable currents at present are becoming ever higher, yet the short-circuit current need not necessarily also become higher. Given this development, a point is soon reached at which it is no longer possible to design a suitable fuse.

SUMMARY OF THE INVENTION

In the rechargeable battery of the invention, beyond the generic characteristics, a switch is provided, which is connected parallel to the fuse and responds to certain electrical signals of the device. The signals can be delivered to the switch via the signal connection, so that the switch bypasses the fuse, once the signal connection is established and the aforementioned signals occur.

The fundamental concept of the invention is the implementation of a distinction between situations, that is, whether when current is being drawn by a device, a normal or an abnormal operating situation is present. If the signal connection is established and (as a second necessary condition) the aforementioned signals do in fact occur, then the rechargeable battery recognizes a normal operating situation and bypasses the fuse while the current is being drawn, which in this situation causes no harm. On the contrary, there is an advantage that in designing the fuse, no attention need be paid to conditions in the normal operating situation, so that the fuse can be designed independently of the allowed continuous current in normal operation. The ratio between the short-circuit current and the allowable continuous current, in designing the fuse, can thus be selected to be less than 2 in particular, since this continuous current in normal operation flows only via the switch, and thus the fuse is not loaded during normal discharging. The separate signal connection with the rechargeable battery, which is already present for other purposes in todays complex battery-operated devices and machines, can be used according to the invention for distinguishing between situations, so that besides it, essentially only one additional, simple switch is necessary to realize the invention.

An embodiment of the invention is especially preferred in which the aforementioned signals occur at least during the drawing of current by the device, and that the switch bypasses the fuse as soon as the aforementioned signals occur. This chronological correlation, which in most cases is desirable, of bypassing the fuse with the drawing of current can accordingly be achieved without making further provisions, by the direct chronological coupling with the usual signal courses in the normal operating situation.

In a refinement of the aforementioned embodiment, this is attainable quite simply by providing that the signal connection can be established by means of a separate electrical contact of the rechargeable battery which contact is electrically connected to the switch, so that the switch is triggerable directly by the device via the electrical signal connection. This embodiment can especially advantageously be refined in that a sensor is integrated with the rechargeable battery and can be acted upon by the device with a voltage signal via the separate contact of the rechargeable battery and by means of the voltage signal, the switch is simultaneously triggerable. Accordingly, a sensor already present in the rechargeable battery for other purposes, preferably a hot conductor for measuring the cell temperature of the rechargeable battery, can be utilized to realize the bypassing of the fuse.

In a further embodiment, it is advantageous that the signal connection can be established, even without direct electrical contact between the rechargeable battery and the device, namely by means of an (existing) inductive or capacitive coupling or by means of a spark, so that the switch is triggerable directly by the device via the electromagnetic signal connection.

In a further embodiment of the invention, indirect bypassing of the fuse by the device is equally possible by a circuit arrangement connected electrically to the switch being integrated with the rechargeable battery and connectable to the device via the signal connection, so that the switch is triggerable by the circuit arrangement that communicates with the device.

It is advantageous that in all the embodiments of the invention, the switch can be embodied selectively as a relay, an electronic switch, or an electromechanical switch.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
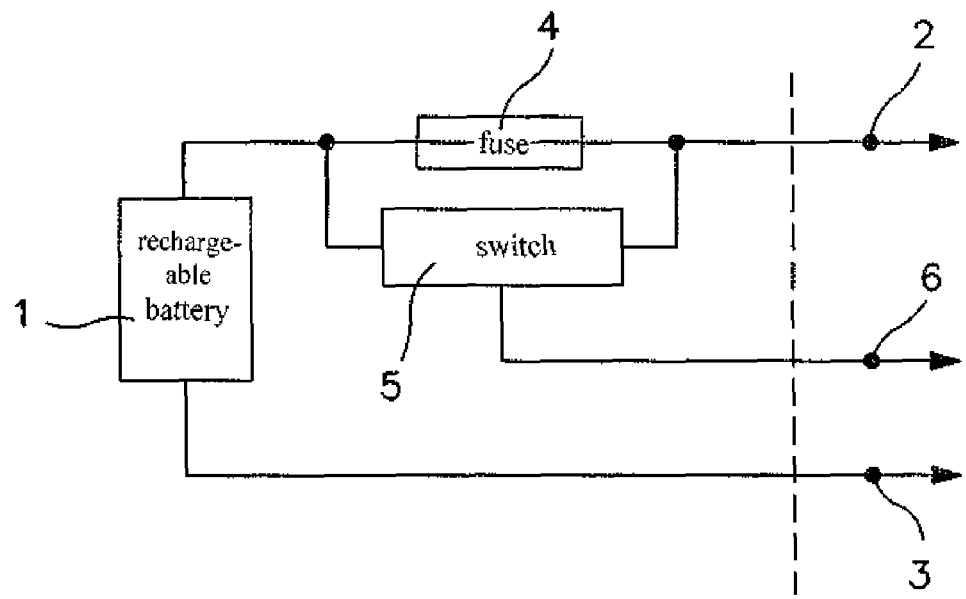
FIG. 1, schematically in a circuit diagram, shows an exemplary embodiment for the direct triggering of the switch by the device.

FIG. 1 shows a first exemplary embodiment of the invention. The two poles of a rechargeable battery 1 having one or more electrochemical cells are connected to connection terminals or contacts 2 and 3 that are disposed on the periphery of the battery pack. The terminals 2 and 3 serve to connect a current-drawing device (not shown) or to charge the rechargeable battery 1. A fuse 4 is connected between one pole of the rechargeable battery 1 and the associated terminal 2. A switch 5, such as a relay or a field effect transistor, which is connected to a separate electrical contact 6, is connected parallel to the fuse 4. This separate contact 6 serves not to draw current for a connected device but rather to establish a signal connection with the rechargeable battery 1 that is usual in complex battery-operated devices and machines. Accordingly in the simplest case, the signal connection comprises a continuous electrically conductive connection between the rechargeable battery 1, or switch 5, and the device. This signal connection is optionally made even before current is drawn from the rechargeable battery 1 by a normal device. The signal connection can be a standard provision for monitoring of the rechargeable battery 1 by the device operated by the rechargeable battery. For instance, a hot conductor (or other sensor) can be integrated with the rechargeable battery 1, with the aid of which the device can detect the instant cell temperature in the rechargeable battery 1 by evaluating the voltage signal that—typically while current is being drawn—is applied.

The mode of operation of this exemplary embodiment will be described below. If and as soon as the signal connection is established by connecting the device to the rechargeable battery 1, and if moreover the device outputs the voltage signals provided for a normal connection or operation—in particular while current is being drawn—then in every case, the switch 5 is also triggered directly by the device. The switch 5 closes, so that during the discharging, the fuse 4 is bypassed by the switch 5. The bypassing is done in this case by the normal device. Because of the bypassing, during the discharging, the fuse 4 is not loaded since all the current is flowing via the switch 5. In that case, the fuse 4 is not needed either, since while current is being drawn normally, a suppressor circuit is active, and the fuse can therefore be designed independently of the possibly high continuous current that flows during a normal operating situation.

If on the other hand a situation exists in which for instance no device is present, or an existing device is not arranged for establishing a signal connection with the rechargeable battery 1, or a signal connection is provided for but is not occurring, or, if the signal connection has been successfully established, the connected device is not arranged for outputting the signals to be expected for normal devices, then the switch 5 does not respond, and the fuse 4 is not bypassed; instead, the fuse is operative and monitors the current flowing through it for a fault situation.

Figure 2:
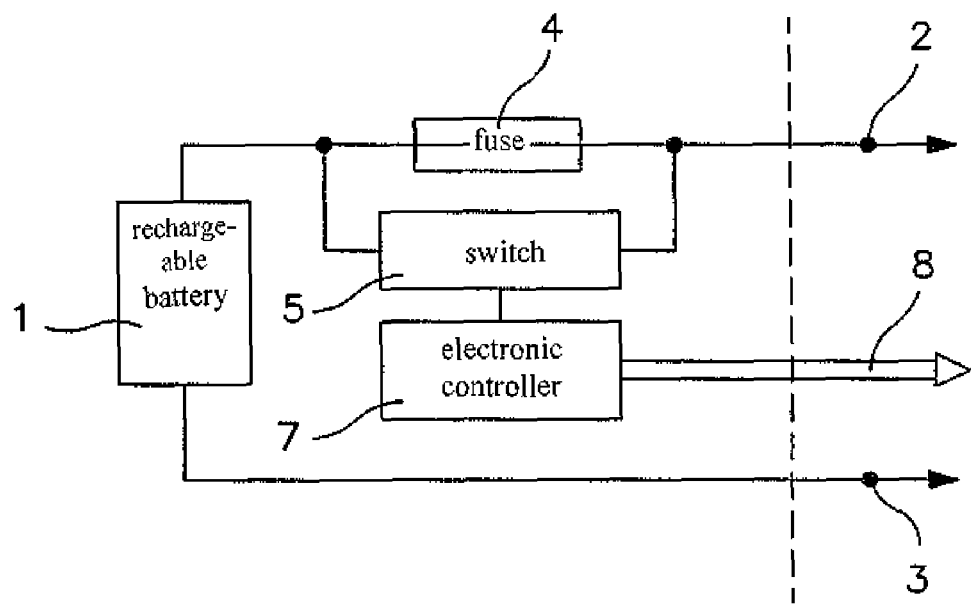
FIG. 2, in the same kind of illustration, shows an exemplary embodiment for triggering the switch by means of a circuit that communicates with the device.

In FIG. 2, an embodiment of a rechargeable battery 1 of the invention is shown in which the Rise 4 is bypassed by the device by means of indirect triggering of the switch 5. For instance, a electronic controller 7, integrated as a standard provision with the rechargeable battery 1 and connected via a bus line 8 to the device intended for drawing current, can be connected electrically to the switch 5, as shown. In the event of correct, normal communication of the device with the controller 7, the controller 7 makes the switch 5 conductive— that is, it does so indirectly based on the electrical signals from the device—and the fuse 4 is bypassed. Otherwise, the fuse 4 remains operative.

The foregoing relates to preferred exemplary embodiments of the invention, it being understood that other variants and embodiments thereof are possible within the spirit and scope of the invention, the latter being defined by the appended claims.

I claim:

1. A rechargeable battery, having a fuse for guarding against external short circuits, and having, between the rechargeable battery and a device typically provided for drawing current from the rechargeable battery, an electrical or electromagnetic signal connection not intended for drawing current being established, and further having a switch connected parallel to the fuse and which switch responds to certain electrical signals of the device, which electrical signals can be delivered to the switch via the signal connection, so that the switch bypasses the fuse, once the signal connection is established and the electrical signals occur.

2. The rechargeable battery as defined by claim 1, wherein the electrical signals occur at least during the drawing of current by the device, and the switch bypasses the fuse as soon as the electrical signals occur.

3. The rechargeable battery as defined by claim 2, wherein the signal connection can be established by means of a separate electrical contact of the rechargeable battery, the separate electrical contact being electrically connected to the switch, so that the switch is triggerable directly by the device via the electrical signal connection.

4. The rechargeable battery as defined by claim 3, further having a sensor integrated with the rechargeable battery, wherein the sensor can be acted upon by the device with a voltage signal via the separate contact of the rechargeable battery, and by means of the voltage signal, the switch is simultaneously triggerable.

5. The rechargeable battery as defined by claim 4, wherein the sensor is a hot conductor for measuring the cell temperature of the rechargeable battery.

6. The rechargeable battery as defined by claim 1, wherein the signal connection can be established by means of an inductive or capacitive coupling or by means of a spark, so that the switch is triggerable directly by the device via the electromagnetic signal connection.

7. The rechargeable battery as defined by claim 2, wherein the signal connection can be established by means of an inductive or capacitive coupling or by means of a spark, so that the switch is triggerable directly by the device via the electromagnetic signal connection.

8. The rechargeable battery as defined by claim 1, further having a circuit arrangement connected electrically to the switch and being integrated with the rechargeable battery, the circuit arrangement being connectable to the device via the signal connection, so that the switch is triggerable by the circuit arrangement communicating with the device.

9. The rechargeable battery as defined by claim 2, further having a circuit arrangement connected electrically to the switch and being integrated with the rechargeable battery, the circuit arrangement being connectable to the device via the signal connection, so that the switch is triggerable by the circuit arrangement communicating with the device.

10. The rechargeable battery as defined by claim 1, wherein the switch is embodied as a relay, an electronic switch, or an electromechanical switch.

11. The rechargeable battery as defined by claim 2, wherein the switch is embodied as a relay, an electronic switch, or an electromechanical switch.

12. The rechargeable battery as defined by claim 3, wherein the switch is embodied as a relay an electronic switch, or an electromechanical switch.

13. The rechargeable battery as defined by claim 4, wherein the switch is embodied as a relay, an electronic switch, or an electromechanical switch.

14. The rechargeable battery as defined by claim 5, wherein the switch is embodied as a relay, an electronic switch, or an electromechanical switch.

15. The rechargeable battery as defined by claim 6, wherein the switch is embodied as a relay, an electronic switch, or an electromechanical switch.

16. The rechargeable battery as defined by claim 7, wherein the switch is embodied as a relay, an electronic switch, or an electromechanical switch.

17. The rechargeable battery as defined by claim 8, wherein the switch is embodied as a relay, an electronic switch, or an electromechanical switch.

18. The rechargeable battery as defined by claim 9, wherein the switch is embodied as a relay, an electronic switch, or an electromechanical switch.

\* \* \* \* \*